US012424149B2

(12) United States Patent
Lee et al.

(10) Patent No.: US 12,424,149 B2
(45) Date of Patent: Sep. 23, 2025

(54) PIXEL AND DISPLAY DEVICE INCLUDING THE SAME

(71) Applicant: Samsung Display Co., LTD., Yongin-si (KR)

(72) Inventors: Sang Myoung Lee, Yongin-si (KR); Su Bin Park, Yongin-si (KR); Sang Hyun Kang, Yongin-si (KR); Dae Cheol Kim, Yongin-si (KR); Do Yeong Park, Yongin-si (KR); Joon Huh, Yongin-si (KR)

(73) Assignee: Samsung Display Co., LTD., Gyeonggi-do (KR)

( * ) Notice: Subject to any disclaimer, the term of this patent is extended or adjusted under 35 U.S.C. 154(b) by 0 days.

(21) Appl. No.: 18/496,921

(22) Filed: Oct. 30, 2023

(65) Prior Publication Data

US 2024/0221623 A1 Jul. 4, 2024

(30) Foreign Application Priority Data

Jan. 4, 2023 (KR) ........................ 10-2023-0001409

(51) Int. Cl.
*G09G 3/32* (2016.01)
*G09G 3/3233* (2016.01)

(52) U.S. Cl.
CPC ............. *G09G 3/32* (2013.01); *G09G 3/3233* (2013.01); *G09G 2300/0819* (2013.01); *G09G 2310/0267* (2013.01); *G09G 2310/0272* (2013.01)

(58) Field of Classification Search
None
See application file for complete search history.

(56) References Cited

U.S. PATENT DOCUMENTS

| | | | | |
|---|---|---|---|---|
| 8,786,587 | B2 | 7/2014 | Kang et al. | |
| 9,972,242 | B2 | 5/2018 | Lim et al. | |
| 11,263,980 | B2 | 3/2022 | Park et al. | |
| 2021/0366397 | A1* | 11/2021 | Na | H10K 59/1213 |
| 2021/0407388 | A1* | 12/2021 | Tian | G09G 3/3233 |
| 2022/0149133 | A1 | 5/2022 | Lee et al. | |
| 2024/0169921 | A1* | 5/2024 | Lee | G09G 3/3233 |

FOREIGN PATENT DOCUMENTS

| | | |
|---|---|---|
| KR | 10-1015339 | 2/2011 |
| KR | 10-1937768 | 1/2019 |
| KR | 10-2020-0076012 | 6/2020 |
| KR | 10-2303216 | 9/2021 |
| KR | 10-2022-0030668 | 3/2022 |
| KR | 10-2022-0062185 | 5/2022 |

* cited by examiner

*Primary Examiner* — Joseph R Haley
(74) *Attorney, Agent, or Firm* — HARNESS, DICKEY & PIERCE, P.L.C.

(57) ABSTRACT

A display device that includes multiple pixels, each pixel includes a light emitting element, a multiple of transistors, multiple voltage sources and capacitors. The pixel circuit is designed and the pixels are driven so that a driving current going through the light emitting element is independent of a threshold voltage of a driving transistor of the multiple transistors. As a result, luminance variation due to threshold voltage can be minimized, and residual image can be reduced.

20 Claims, 14 Drawing Sheets

SLi: SSL1i, SSL2i, SSL3i, SSL4i

SLi: SSL1i, SSL2i, SSL3i, SSL4i

SLi: SSL1i, SSL2i, SSL3i, SSL4i
VINT: VINT1, VINT2
PL3: PL3_1, PL3_2

PIXEL AND DISPLAY DEVICE INCLUDING THE SAME

CROSS-REFERENCE TO RELATED APPLICATIONS

This application claims priority under 35 U.S.C. § 119 from Korean Patent Application No. 10-2023-0001409 filed on Jan. 4, 2023 in the Korean Intellectual Property Office, the entire content of which are incorporated herein by reference.

BACKGROUND

1. Technical Field

The disclosure relates to a pixel and a display device including the same.

2. Description of the Related Art

As information technology is developed, importance of a display device, which is a connection medium between a user and information, has been highlighted. In response to this, a use of a display device such as a liquid crystal display device and an organic light emitting display device is increasing.

The display device may display an image (e.g., predetermined or selectable image) using pixels. Each of the pixels may include a driving transistor and a light emitting element, and may generate light of a luminance (e.g., predetermined or selectable luminance) while controlling a magnitude of current (or current amount) supplied to the light emitting element using the driving transistor. Here, a threshold voltage of the driving transistor included in each of the pixels may be set differently due to a process deviation, and thus light of different luminance may be emitted from the pixels in response to the same data signal.

SUMMARY

An object of the disclosure is to provide a pixel and a display device including the same capable of compensating for a characteristic of a driving transistor included in each of pixels.

Another object of the disclosure is to provide a pixel and a display device including the same that produces a driving current through a light emitting element that is independent of a threshold voltage of a driving transistor.

Another object of the disclosure is to provide a pixel and a display device including the same capable of improving stain and afterimage characteristics in a pixel including an oxide transistor.

According to embodiments of the disclosure, a pixel may include a light emitting element, a first transistor that controls a magnitude of current flowing from a first voltage line to a second voltage line via the light emitting element in response to a voltage at a first node electrically connected to a first gate electrode of the first transistor, a second transistor electrically connected between a data line and the first node and having a gate electrode electrically connected to a first scan line, a third transistor electrically connected between the first transistor and a first electrode of the light emitting element and having a gate electrode electrically connected to an emission control line, a fourth transistor electrically connected between the first electrode of the light emitting element and a third voltage line to which a first initialization voltage is supplied and having a gate electrode electrically connected to a second scan line, a first capacitor electrically connected between the first node and a second node, the second node being a common node between the first transistor and the third transistor, and a second capacitor electrically connected between the first voltage line and the second node.

According to an embodiment, the pixel may further include a fifth transistor electrically connected between a fourth voltage line to which a reference voltage is supplied and the first node and having a gate electrode electrically connected to a third scan line, and a sixth transistor electrically connected between the first voltage line and the first transistor and having a gate electrode electrically connected to the emission control line.

According to an embodiment, the pixel may further include a seventh transistor electrically connected between the second node and the third voltage line and having a gate electrode electrically connected to a fourth scan line.

According to an embodiment, the pixel may further include a seventh transistor electrically connected between the second node and a fifth voltage line to which a second initialization voltage supplied, and having a gate electrode electrically connected to a fourth scan line.

According to an embodiment, turn-on periods of the fifth transistor and the seventh transistor may overlap at least in a partial period.

According to an embodiment, the turn-on period of the seventh transistor may not overlap a turn-on period of the third transistor and a sixth transistor, and the turn-on period of the fifth transistor may at least partially overlap the turn-on period of the third transistor and the sixth transistor.

According to an embodiment, a turn-on period of the second transistor may not overlap a turn-on period of the third transistor, the fourth transistor, the fifth transistor, and the seventh transistor, and may be turned on after the fifth transistor and the seventh transistor may be turned on.

According to an embodiment, a second gate electrode of the first transistor may be electrically connected to the second node.

According to an embodiment of the disclosure, a display device may include a pixel that may be driven during a frame that may include a display scan period in which the pixel may receive a data signal and a self-scan period in which the data signal may be maintained, a scan driver that may drive a plurality of first scan lines, a plurality of second scan lines, a plurality of third scan lines, and a plurality of fourth scan lines, an emission driver that may drive a plurality of emission control lines, a data driver that may drive a plurality of data lines, and a power supply that may supply a first voltage, a second voltage, a reference voltage, and a first initialization voltage, wherein the pixel may be disposed on an i-th horizontal line and a j-th vertical line, "i" and "j" each being a natural number, the pixel may include a light emitting element, a first transistor that may control a magnitude of a current flowing from a first voltage line to which the first voltage is supplied to a second voltage line to which the second voltage is supplied via the light emitting element in response to a voltage at a first node electrically connected to a first gate electrode of the first transistor, a second transistor that is electrically connected between one of the plurality of data lines and the first node and is turned on in case that a first scan signal is supplied to one of the plurality of first scan lines electrically connected to a gate electrode of the second transistor, a third transistor that is electrically connected between the first transistor and a first electrode of the light emitting element and is turned off in case that an emission control signal is supplied to one of the plurality of emission control lines electrically connected to a gate electrode of the third transistor, a fourth transistor that is electrically connected between the first electrode of the light emitting element and a third voltage line to which the first initialization voltage is supplied, and is turned on in case that a second scan signal is supplied to one of the plurality of second scan lines electrically connected to a gate electrode of the fourth transistor, a first capacitor electrically connected between the first node and a second node, the second node being a common node between the first transistor and the third transistor and a second capacitor electrically connected between the first voltage line and the second node.

According to an embodiment, the pixel may further include a fifth transistor electrically connected between a fourth voltage line to which a voltage of the reference voltage is supplied and the first node, and is turned on in case that a third scan signal may be supplied to one of the plurality of third scan lines electrically connected to a gate electrode of the fifth transistor, and a sixth transistor electrically connected between the first voltage line and the first transistor and may be turned off in case that the emission control signal may be supplied to the one of the plurality of the emission control lines.

According to an embodiment, the pixel may further include a seventh transistor that is electrically connected between the second node and the third voltage line and may be turned on in case that a fourth scan signal may be supplied to one of the plurality of fourth scan lines electrically connected to a gate electrode of the seventh transistor.

According to an embodiment, the pixel may further include a seventh transistor electrically connected between the second node and a fifth voltage line to which a second initialization voltage may be supplied, and turned on in case that a fourth scan signal may be supplied to one of the plurality of the fourth scan lines electrically connected to a gate electrode of the seventh transistor.

According to an embodiment, the display scan period may include a first period, a second period, a third period, and a fourth period that are temporally successive.

According to an embodiment, the emission driver may supply the emission control signal to the one of the plurality of emission control lines during the first period and the third period, and the scan driver may supply the fourth scan signal to the one of the plurality of fourth scan lines in the first period, may supply the third scan signal to the one of the plurality of third scan lines during the first period and the second period, and may supply the first scan signal to the one of the plurality of first scan lines in the third period.

According to an embodiment, the scan driver may supply the second scan signal to the one of the plurality of second scan lines during a fourth period between the third period and the fifth period, and the emission driver may supply the emission control signal to the one of the plurality of emission control lines during the fourth period.

According to an embodiment, the scan driver may supply the second scan signal to the one of the plurality of second scan lines during a fourth period between the first period and the second period, and the emission driver may supply the emission control signal to the one of the plurality of emission control lines during the fourth period.

According to an embodiment, the first transistor may further include a second gate electrode electrically connected to the second node.

According to an embodiment, the self-scan period may include a first period, a second period, a third period, and a fourth period that are temporally successive.

According to an embodiment, the scan driver may supply the second scan signal to the one of the plurality of second scan lines during a fourth period between the third period and the fifth period, and the emission driver may supply the emission control signal to the one of the plurality of emission control lines during the first period, the second period, the third period, and the fourth period.

According to an embodiment, the scan driver may supply the second scan signal to the one of the plurality of second scan lines during a fourth period between the first period and the second period, and the emission driver may supply the emission control signal to the one of the plurality of emission control lines during the first period, the fourth period, the second period, and the third period.

Objects of the disclosure may not be limited to the objects described above, and other technical objects which may not be described will be clearly understood by those skilled in the art from the following description.

In accordance with the pixel and the display device including the same according to the embodiments of the disclosure, a magnitude of current supplied to the light emitting element may be controlled regardless of a threshold voltage of a driving transistor, and thus image quality may be improved.

In addition, in the pixel and the display device including the same according to the embodiments of the disclosure, an initialization voltage supplied to the light emitting element may not be transferred to the capacitor storing a data signal, and thus a threshold voltage compensation capability may be improved.

However, an effect of the disclosure may not be limited to the above-described effect, and may be variously expanded without departing from the spirit and scope of the disclosure.

BRIEF DESCRIPTION OF THE DRAWINGS

An additional appreciation according to the embodiments of the disclosure will become more apparent by describing in detail the embodiments thereof with reference to the accompanying drawings, wherein.

DETAILED DESCRIPTION OF THE EMBODIMENTS

Figure 1:
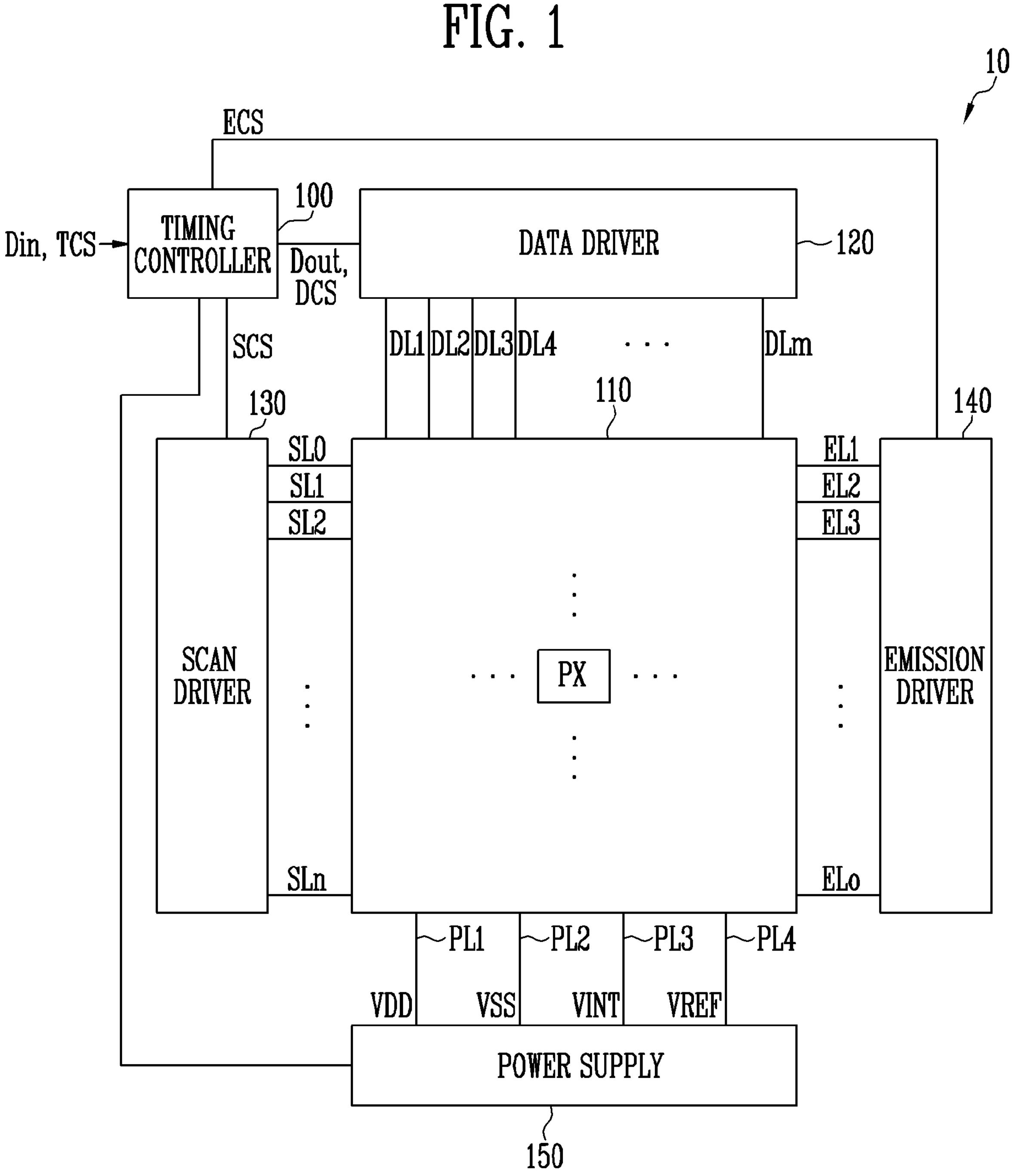
FIG. 1 is a schematic diagram illustrating a display device according to an embodiment of the disclosure.

In the following description, for the purposes of explanation, numerous specific details are set forth in order to provide a thorough understanding of various embodiments or implementations of the disclosure. As used herein "embodiments" and "implementations" are interchangeable words that are non-limiting examples of devices or methods disclosed herein. It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in an embodiment.

Unless otherwise specified, the illustrated embodiments are to be understood as providing features of the disclosure. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be predisposed differently from the described order. For example, two consecutively described processes may be predisposed substantially at the same time or predisposed in an order opposite to the described order. Also, like reference numerals and/or reference characters denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Also, when an element is referred to as being "in contact" or "contacted" or the like to another element, the element may be in "electrical contact" or in "physical contact" with another element; or in "indirect contact" or in "direct contact" with another element. Further, the X-axis, the Y-axis, and the Z-axis may not be limited to three axes of a rectangular coordinate system, such as the x, y, and z axes, and may be interpreted in a broader sense. For example, the X-axis, the Y-axis, and the Z-axis may be perpendicular to one another, or may represent different directions that may not be perpendicular to one another.

For the purposes of this disclosure, "at least one of A and B" may be construed as A only, B only, or any combination of A and B. Also, "at least one of X, Y, and Z" and "at least one selected from the group consisting of X, Y, and Z" may be construed as X only, Y only, Z only, or any combination of two or more of X, Y, and Z. As used herein, the term "and/or" includes any and all combinations of one or more of the associated listed items. A description that a component is "configured to" perform a specified operation may be defined as a case where the component is constructed and arranged with structural features that can cause the component to perform the specified operation.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, may not be necessarily intended to be limiting.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be disposed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, portion, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein. Hereinafter, embodiments of the disclosure will be described in detail with reference to the accompanying drawings.

FIG. 1 is a schematic diagram illustrating a display device according to an embodiment of the disclosure. Referring to FIG. 1, the display device 10 according to an embodiment of the disclosure may include a timing controller 100, a pixel portion 110, a data driver 120, a scan driver 130, an emission driver 140, and a power supply 150. The above-described configurations may be implemented as separate integrated circuits, and two or more configurations among the above-described configurations may instead be integrated into one integrated circuit and implemented.

The pixel portion 110 may include multiple pixels PX connected to scan lines SL0 to SLn, data lines DL1 to DLm, emission control lines EL1 to ELo, and voltage lines PL1, PL2, PL3, and PL4. (Here, "n", "m", and "o" may be natural numbers). Furthermore, a pixel PXij (refer to FIG. 2) positioned on an i-th horizontal line (or pixel row) and a j-th vertical line (or pixel column) may be electrically connected to an i-th scan line SLi and a j-th data line DLj (for example, "i" is a natural number equal to or less than "n" and "j" is a natural number equal to or less than "m").

In case that a scan signal is supplied to the scan lines SL0 to SLn, the pixels PX may be selected in a horizontal line portion (for example, the pixels PX electrically connected to the same scan line may be classified as one horizontal line (or pixel row)), and the pixels PX selected by the scan signal may be supplied with a data signal from a data line (any one of DL1 to DLm) electrically connected thereto. The pixels PX receiving the data signal may generate light of a luminance (e.g., predetermined or selectable luminance) in response to a voltage of the data signal.

The data driver 120 may receive output data Dout and a data driving signal DCS from the timing controller 100. The data driving signal DCS may include a sampling signal and/or timing signals necessary for driving the data driver 120. The data driver 120 may generate the data signal based on the data driving signal DCS and the output data Dout. For example, the data driver 120 may generate an analog data signal based on a grayscale of the output data Dout. The data signal generated by the data driver 120 may be supplied to the data lines DL1 to DLm to be synchronized with the scan signal.

The scan driver 130 may receive a scan driving signal SCS from the timing controller 110. The scan driving signal SCS may include a scan start signal and clock signals necessary for driving the scan driver 130. The scan driver 130 may generate the scan signal while shifting the scan start signal in response to the clock signal. For example, the scan driver 130 may sequentially supply the scan signal to the scan lines SL0 to SLn. The scan signal may be set to a gate-on voltage so that a transistor may be turned on. For example, a scan signal of a low level may be supplied to a P-type transistor, and a scan signal of a high level may be supplied to an N-type transistor. A transistor receiving the scan signal may be turned on in response to the scan signal. Thereafter, a fact that the scan signal is supplied may be that a gate-on voltage is supplied to a scan line SL. In addition, a fact that the scan signal may not be supplied may be that a gate-off voltage is supplied to the scan line SL.

The emission driver 140 may receive an emission driving signal ECS from the timing controller 100. The emission driving signal ECS may include an emission start signal and clock signals necessary for driving the emission driver 140. The emission driver 140 may generate an emission control signal while shifting the emission start signal in response to the clock signal. For example, the emission driver 140 may sequentially supply the emission control signal to the emission control lines EL1 to ELo. The emission control signal may be set to a gate-off voltage so that the transistor may be turned off. For example, an emission control signal of a high level may be supplied to a P-type transistor, and an emission control signal of a low level may be supplied to an N-type transistor. A transistor receiving the emission control signal may be set to a turn-off state during a period in which the emission control signal is supplied. Thereafter, a fact that the emission control signal is supplied may be that a gate-off voltage is supplied to the emission control line EL. In addition, a fact that the emission control signal may not be supplied may be that a gate-on voltage is supplied to the emission control line EL.

The timing controller 100 may receive input data Din and a timing control signal TCS from a host system through an interface. For example, the timing controller 100 may receive the input data Din and the timing control signal TCS from at least one of a graphics processing unit (GPU), a central processing unit (CPU), and an application processor (AP) included in the host system. The timing control signal TCS may include a vertical synchronization signal, a horizontal synchronization signal, a data enable signal, a clock signal, and the like.

The timing controller 100 may generate the scan driving signal SCS, the emission driving signal ECS, and the data driving signal DCS based on the timing control signal TCS. The scan driving signal SCS, the emission driving signal ECS, and the data driving signal DCS may be supplied to the scan driver 130, the emission driver 140, and the data driver 120, respectively. The timing controller 100 may rearrange the input data Din according to a specification of the display device 10. The timing controller 100 may also correct the input data Din to generate the output data Dout, and supply the output data Dout to the data driver 120. In an embodiment, the timing controller 100 may correct the input data Din in response to an optical measurement result measured in a process.

The power supply 150 may generate various driving voltages necessary for driving the display device 10. For example, the power supply 150 may generate first voltage (or first power) VDD, second voltage (or second power) VSS, reference voltage (or reference power) VREF, and initialization voltage (or initialization power) VINT.

The first voltage VDD may be supplied to a first voltage line (or first power line) PL1. The first voltage line PL1 may be commonly electrically connected to the pixels PX, and may supply a first voltage VDD to the pixels PX. The second voltage VSS may be supplied to a second voltage line (or second power line) PL2. The second voltage line PL2 may be commonly electrically connected to the pixels PX, and may supply a second voltage VSS to the pixels PX. The initialization voltage VINT may be supplied to a third voltage line (or third power line) PL3. The third voltage line PL3 may be commonly electrically connected to the pixels PX, and may supply the initialization voltage VINT to the pixels PX. The reference voltage VREF may be supplied to a fourth voltage line (or fourth power line) PL4. The fourth voltage line PL4 may be commonly electrically connected to the pixels PX, and may supply the reference voltage VREF to the pixels PX.

A connection relationship between the voltage lines PL1, PL2, PL3, and PL4 and the pixels PX may not be limited thereto. For example, multiple first voltage lines PL1 may be electrically connected to different pixels, multiple second voltage lines PL2 may be electrically connected to different pixels, multiple third voltage lines PL3 may be electrically connected to different pixels, and multiple fourth voltage lines PL4 may be electrically connected to different pixels.

Figure 2:
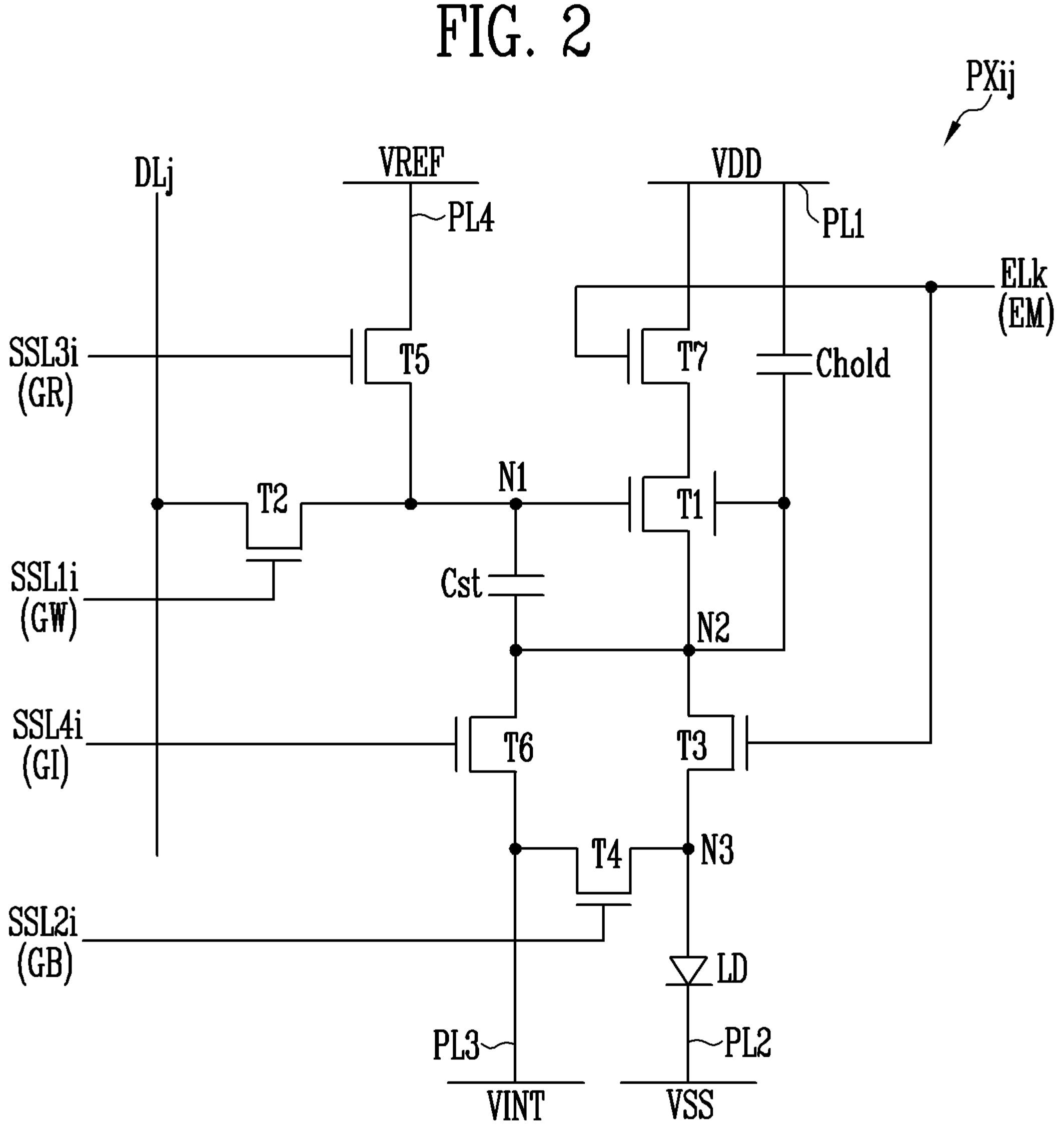
FIG. 2 is a schematic diagram illustrating an embodiment of a pixel shown in FIG. 1.
Figure 3:
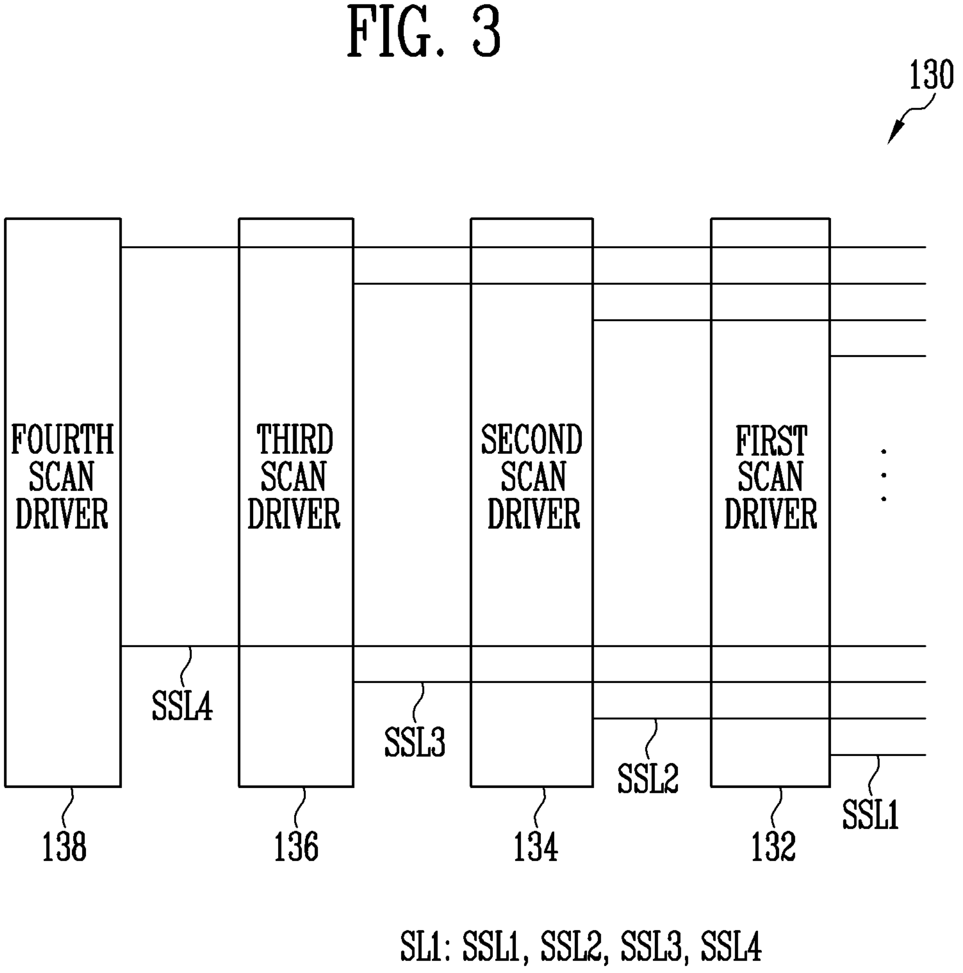
FIG. 3 is a schematic diagram illustrating an embodiment of a scan driver shown in FIG. 1.

FIG. 2 is a schematic diagram illustrating an embodiment of the pixel (or pixel circuit) shown in FIG. 1. In FIG. 2, the pixel shown on the i-th horizontal line and the j-th vertical line is shown. Referring to FIG. 2, the pixel PXij may be electrically connected to corresponding signal lines SLi, DLj, and ELk. For example, the pixel PXij may be electrically connected to an i-th scan line SLi, a j-th data line DLj, and k-th (here, “k” is a natural number equal to or less than “o”) emission control line ELk. The i-th scan line SLi may include multiple scan lines SSL1i, SSL2i, SSL3i, and SSL4i. For example, the pixel PXij may be electrically connected to a first scan line SSL1i, a second scan line SSL2i, a third scan line SSL3i, and a fourth scan line SSL4i. In case that the pixel PXij is electrically connected to the first scan line SSL1i, the second scan line SSL2i, the third scan line SSL3i, and the fourth scan line SSL4i, the scan driver 130 may include a first scan driver 132, a second scan driver 134, a third scan driver 136, and a fourth scan driver 138 as shown in FIG. 3.

The pixel PXij may be further electrically connected to the voltage lines PL1 to PL4. For example, the pixel PXij may be electrically connected to the first voltage line PL1, the second voltage line PL2, the third voltage line PL3, and the fourth voltage line PL4. The pixel PXij according to an embodiment of the disclosure may include a light emitting element LD and a pixel circuit for controlling a magnitude of current (or current amount) supplied to the light emitting element LD. The light emitting element LD may be electrically connected between the first voltage line PL1 and the second voltage line PL2. For example, a first electrode (for example, an anode electrode) of the light emitting element LD may be electrically connected to the first voltage line PL1 via a third node N3, a third transistor T3, a second node N2, a first transistor T1, and a seventh transistor T7, and a second electrode (for example, a cathode electrode) of the light emitting element LD may be electrically connected to the second voltage line PL2. The light emitting element LD may generate light of a luminance corresponding to a magnitude of current supplied from the pixel circuit.

The light emitting element LD may be selected as an organic light emitting diode. The light emitting element LD may instead be selected as an inorganic light emitting diode such as a micro light emitting diode (LED) or a quantum dot light emitting diode. The light emitting element LD may instead be an element in which an organic material and an inorganic material may be combined. Although the pixel PXij is shown as including a single light emitting element LD in FIG. 2, in an embodiment, the pixel PXij may include multiple light emitting elements LD, and the plurality of light emitting elements LD may be electrically connected in series, parallel or series-parallel to each other.

The pixel circuit may include the first transistor T1, a second transistor T2, the third transistor T3, a fourth transistor T4, a fifth transistor T5, a sixth transistor T6, the seventh transistor T7, a first capacitor Cst, and a second capacitor Chold. Here, the first to seventh transistors T1 to T7 may be oxide semiconductor transistors. For example, an active layer (or a semiconductor layer) of the first to seventh transistors T1 to T7 may include an oxide semiconductor layer. In an embodiment, the first to seventh transistors T1 to T7 may be N-type oxide semiconductor transistors.

A first electrode of the first transistor T1 (or a driving transistor) may be electrically connected to a second electrode of the seventh transistor T7, and a second electrode of the first transistor T1 may be electrically connected to a second node N2. In addition, a first gate electrode of the first transistor T1 may be electrically connected to a first node N1, and a second gate electrode (or a back gate electrode) of the first transistor T1 may be electrically connected to the second node N2. The first transistor T1 may control a magnitude of current supplied from the first voltage VDD to the second voltage VSS via the light emitting element LD in response to a voltage at the first node N1.

The first transistor T1 may be formed as a double gate transistor including the first gate electrode and the second gate electrode. In case that the second gate electrode is electrically connected to the second node N2, a gate-source voltage and a driving current of the first transistor T1 may be stably maintained.

The second transistor T2 may be electrically connected between the data line DLj and the first node N1. In addition, a gate electrode of the second transistor T2 may be electrically connected to the first scan line SSL1i. The second transistor T2 may be turned on in case that a first scan signal GW is supplied to the first scan line SSL1i to electrically connect the data line DLj and the first node N1.

The third transistor T3 may be electrically connected between the second node N2 and a third node N3. The second node N2 may be a node where the second electrode of the first transistor T1 and a first electrode of the third transistor T3 are electrically connected, and the third node N3 may be a node electrically connected to the first electrode of the light emitting element LD. A gate electrode of the third transistor T3 may be electrically connected to the emission control line ELk. The third transistor T3 may be turned off in case that an emission control signal EM is supplied to the emission control line ELk, and may be turned on in other cases.

In case that the third transistor T3 is turned on, the second node N2 and the third node N3 may be electrically connected, and thus the first transistor T1 and the light emitting element LD may be electrically connected. In case that the third transistor T3 is turned off, the second node N2 and the third node N3 may be electrically insulated from each other, and thus a current path through which the driving current flows to the light emitting element LD may be blocked.

The fourth transistor T4 may be electrically connected between the third node N3 and the third voltage line PL3. In addition, a gate electrode of the fourth transistor T4 may be electrically connected to the second scan line SSL2i. The fourth transistor T4 may be turned on in case that a second scan signal GB is supplied to the second scan line SSL2i to electrically connect the third voltage line PL3 and the third node N3. In case that the third voltage line PL3 and the third node N3 may be electrically connected, the initialization voltage VINT from the third voltage line PL3 may be supplied to the third node N3. A parasitic capacitor equivalently formed in the light emitting element LD may be discharged, and thus black expression capability may be improved.

The fifth transistor T5 may be electrically connected between the fourth voltage line PL4 and the first node N1. In addition, a gate electrode of the fifth transistor T5 may be electrically connected to the third scan line SSL3i. The fifth transistor T5 may be turned on in case that a third scan signal GR is supplied to the third scan line SSL3i to electrically connect the fourth voltage line PL4 and the first node N1. The fourth voltage line PL4 and the first node N1 may be electrically connected, and the reference voltage VREF may be supplied to the first node N1.

The sixth transistor T6 may be electrically connected between the second node N2 and the third voltage line PL3. In addition, a gate electrode of the sixth transistor T6 may be electrically connected to the fourth scan line SSL4i. The sixth transistor T6 may be turned on in case that a fourth scan signal GI is supplied to the fourth scan line SSL4i to electrically connect the third voltage line PL3 and the second node N2. The third voltage line PL3 and the second node N2 may be electrically connected, and the initialization voltage VINT may be supplied to the second node N2.

The seventh transistor T7 may be electrically connected between the first voltage line PL1 and the first electrode of the first transistor T1. In addition, a gate electrode of the seventh transistor T7 may be electrically connected to the emission control line ELk. The seventh transistor T7 may be turned off in case that the emission control signal EM is supplied to the emission control line ELk, and may be turned on in other cases. In case that the seventh transistor T7 is turned on, a current path through which the driving current flows may be formed in the pixel PXij.

The first capacitor Cst may be electrically connected between the first node N1 and the second node N2. A voltage corresponding to the data signal may be stored in the first capacitor Cst. The second capacitor Chold may be electrically connected between the first voltage line PL1 and the second node N2. The second capacitor Chold may stabilize a voltage of the second node N2.

FIG. 3 is a schematic diagram illustrating an embodiment of the scan driver shown in FIG. 1. Referring to FIG. 3, the scan driver 130 may include the first scan driver 132, the second scan driver 134, the third scan driver 136, and the fourth scan driver 138. The first scan driver 132 may supply the first scan signal GW to first scan lines SSL1 in response to the scan driving signal SCS. For example, the first scan driver 132 may sequentially supply the first scan signal GW to the first scan lines SSL1. The first scan driver 132 may supply the first scan signal GW to the first scan lines SSL1 during a display scan period in which the data signal is input during one frame period. The first scan signal GW supplied to the first scan lines SSL1 may be supplied to be synchronized with the data signal supplied to the data lines DL1 to DLm.

The second scan driver 134 may supply the second scan signal GB to second scan lines SSL2 in response to the scan driving signal SCS. For example, the second scan driver 134 may sequentially supply the second scan signal GB to the second scan lines SSL2. The second scan driver 134 may supply the second scan signal GB to the second scan lines SSL2 during the display scan period DSP and the self-scan period SSP of one frame period.

The third scan driver 136 may supply the third scan signal GR to third scan lines SSL3 in response to the scan driving signal SCS. For example, the third scan driver 136 may sequentially supply the third scan signal GR to the third scan lines SSL3. The third scan driver 136 may sequentially supply the third scan signal GR to the third scan lines SSL3 during the display scan period of one frame period.

The fourth scan driver 138 may supply the fourth scan signal GI to fourth scan lines SSL4 in response to the scan driving signal SCS. For example, the fourth scan driver 138 may sequentially supply the fourth scan signal GI to the fourth scan lines SSL4. The fourth scan driver 138 may sequentially supply the fourth scan signal GI to the fourth scan lines SSL4 during the display scan period of one frame period.

A connection relationship between the scan lines SSL1 to SSL4 and the scan drivers 132, 134, 136, and 138 may not be limited thereto. For example, one scan driver (any one of 132, 134, 136, and 138) may drive multiple scan lines (at least two of SSL1 to SSL4).

Figure 4:
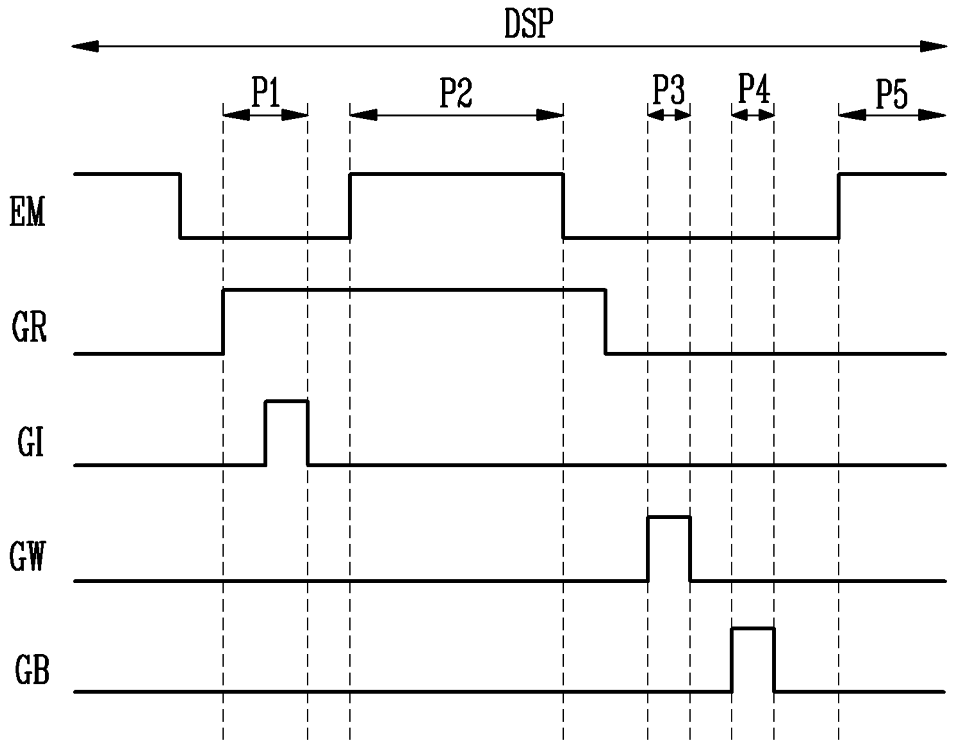
FIG. 4 is a schematic waveform diagram illustrating an embodiment of driving signals supplied to the pixel of FIG. 2 during a display scan period.

FIG. 4 is a schematic waveform diagram illustrating an embodiment of driving signals supplied to the pixel of FIG. 2 during the display scan period. FIGS. 5A to 5E are schematic diagrams illustrating an operation process of the pixel corresponding to the schematic waveform diagram shown in FIG. 4. Referring to FIGS. 4 to 5E, a display scan period DSP of the pixel PXij may include a first period P1, a second period P2, a third period P3, a fourth period P4, and a fifth period P5.

The first period P1 may be set as a period for initializing the first capacitor Cst (or a first initialization period). The second period P2 may be set as a compensation period for compensating for a threshold voltage of the first transistor T1. The third period P3 may be set as a data writing period in which the voltage corresponding to the data signal is stored. The fourth period P4 may be set as an initialization period (or a second initialization period) for initializing the light emitting element LD. The fifth period P5 may be set as an emission period in which the pixel PXij emits light in response to the data signal.

Figure 5A:
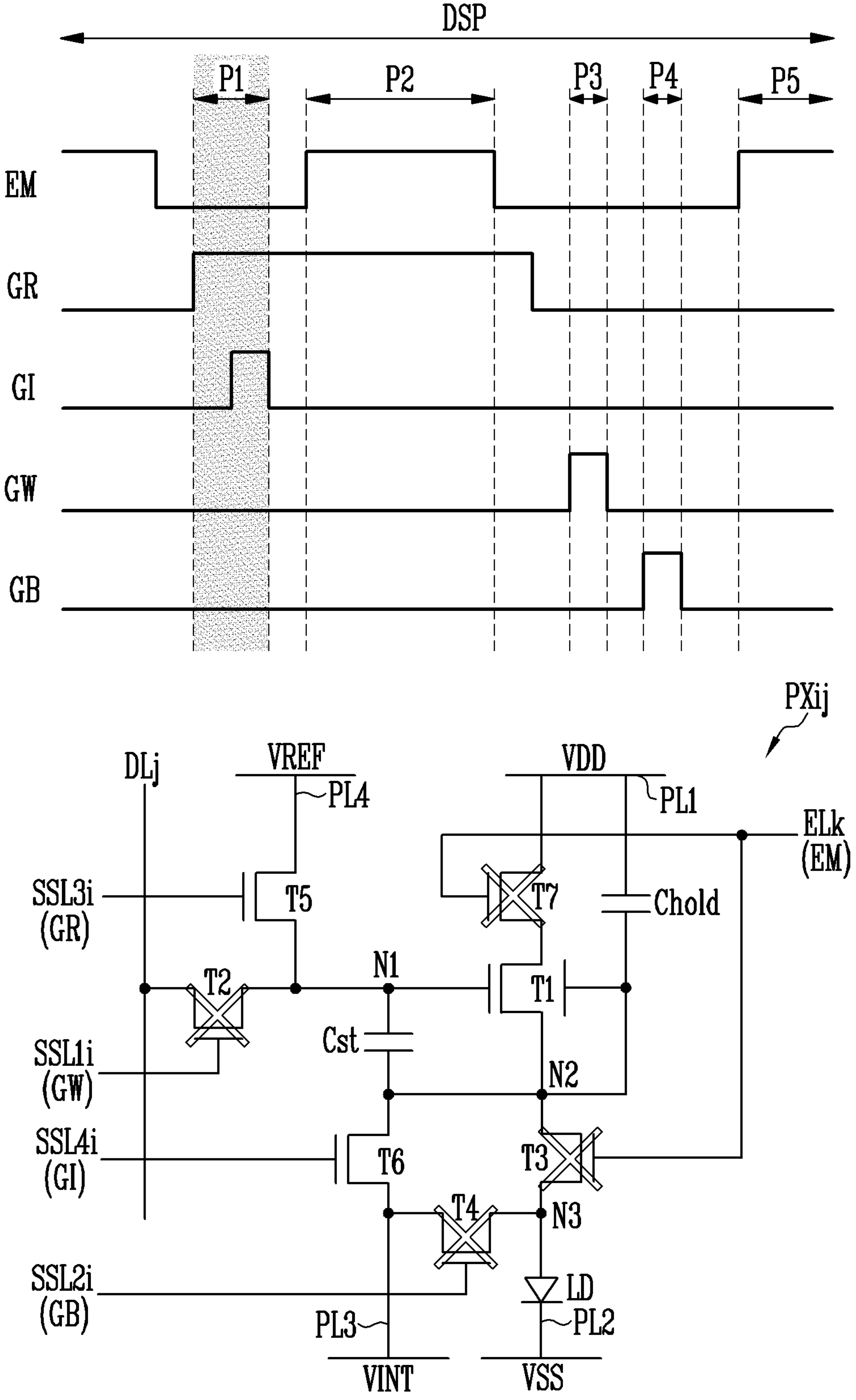
FIGS. 5A to 5E are schematic diagrams illustrating an operation process of the pixel corresponding to the waveform diagram shown in FIG. 4.

Referring to FIG. 5A, during the first period P1, the third scan signal GR may be supplied to the third scan line SSL3i and the fourth scan signal GI may be supplied to the fourth scan line SSL4i. The emission control signal EM may be supplied to the emission control line ELk. In case that the emission control signal EM is supplied to the emission control line ELk, the third transistor T3 and the seventh transistor T7 may be turned off. In case that the third transistor T3 is turned off, electrical connection between the second node N2 and the third node N3 is cut off. In case that the seventh transistor T7 is turned off, electrical connection between the first voltage line PL1 and the first transistor T1 is cut off.

In case that the third scan signal GR is supplied to the third scan line SSL3i, the fifth transistor T5 is turned on, and thus the reference voltage VREF may be supplied to the first node N1. In case that the fourth scan signal GI is supplied to the fourth scan line SSL4, the sixth transistor T6 may be turned on, and thus the initialization voltage VINT may be supplied to the second node N2. In case that the reference voltage VREF is supplied to the first node N1 and the initialization voltage VINT is supplied to the second node N2, the first capacitor Cst and the second capacitor Chold may be initialized. For example, the first period P1 may be a period for initializing the pixel PXij so as not to be affected by the data signal supplied in a previous frame period.

The voltages of the first node N1 and the second node N2 during the first period P1 may be expressed as Equation Group 1.

$$VN1 = VREF$$
$$VN2 = VINT$$
[Equation Group 1]

In Equation Group 1, VN1 may be the voltage of the first node N1, VN2 may be the voltage of the second node N2, VREF may be the reference voltage, and VINT may be the initialization voltage.

Figure 5B:
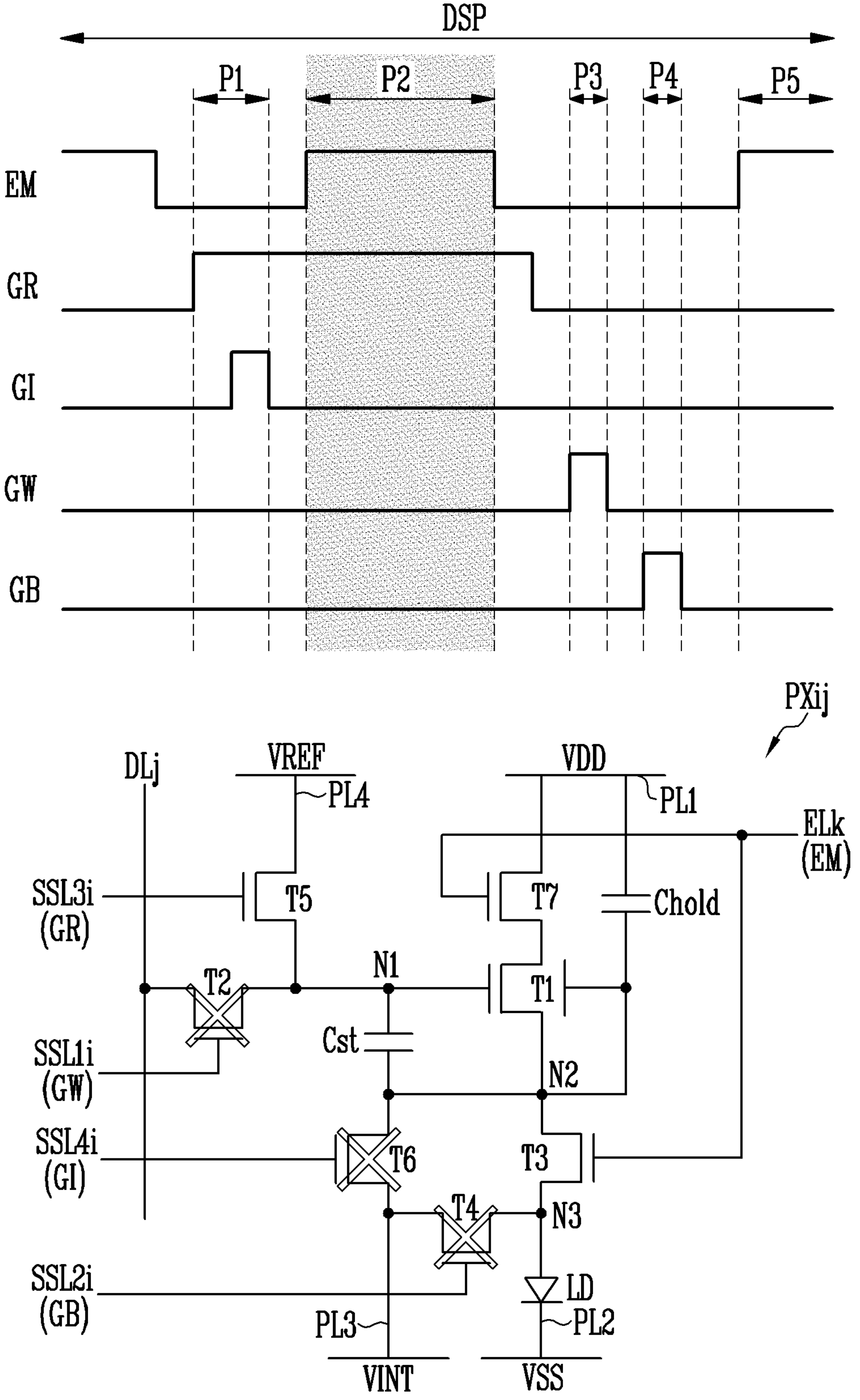

Referring to FIG. 5B, during the second period P2, supply of the emission control signal EM to the emission control line ELk may be stopped and the third scan signal GR may continue to be supplied to the third scan line SSL3i. The third scan signal GR supplied to the third scan line SSL3i may be supplied during the first period P1 and the second period P2. In case that the third scan signal GR is supplied to the third scan line SSL3i, the fifth transistor T5 may be turned on, and thus the reference voltage VREF may continue to be supplied to the first node N1.

In case that supply of the emission control signal EM to the emission control line ELk is stopped, the third transistor T3 and the seventh transistor T7 may be turned on. In case that the third transistor T3 is turned on, the second node N2 and the light emitting element LD may be electrically connected. In case that the seventh transistor T7 is turned on, the first voltage line PL1 and the first transistor T1 may be electrically connected.

Here, the reference voltage VREF is set so that the first transistor T1 may be turned on, and thus the voltage of the second node N2 increases in response to the current supplied from the first transistor T1. During the second period P2, the first node N1 may maintain the reference voltage VREF, and thus the voltage of the second node N2 may be increased to a value obtained by subtracting the threshold voltage of the first transistor T1 from the reference voltage VREF.

During the second period P2, the voltages of the first node N1 and the second node N2 may be expressed as Equation Group 2.

$$VN1 = VREF$$
$$VN2 = VREF - Vth1$$
[Equation Group 2]

In Equation Group 2, Vth1 may be the threshold voltage of the first transistor M1.

During the second period P2, the reference voltage VREF may be set so that the light emitting element LD does not emit light, so that the light emitting element LD maintains a non-emission state. For example, a voltage difference between the voltage (VREF−Vth1) of the second node N2 described in Equation Group 2 and the second voltage VSS may be set to a voltage lower than a threshold voltage of the light emitting element LD.

In addition, a duration of the second period P2 (for example, the threshold voltage compensation period) may be determined by a supply time of the emission control signal EM and the third scan signal GR. Therefore, in an embodiment of the disclosure, the threshold voltage compensation period may be adjusted using the emission control signal EM and the third scan signal GR.

Figure 5C:
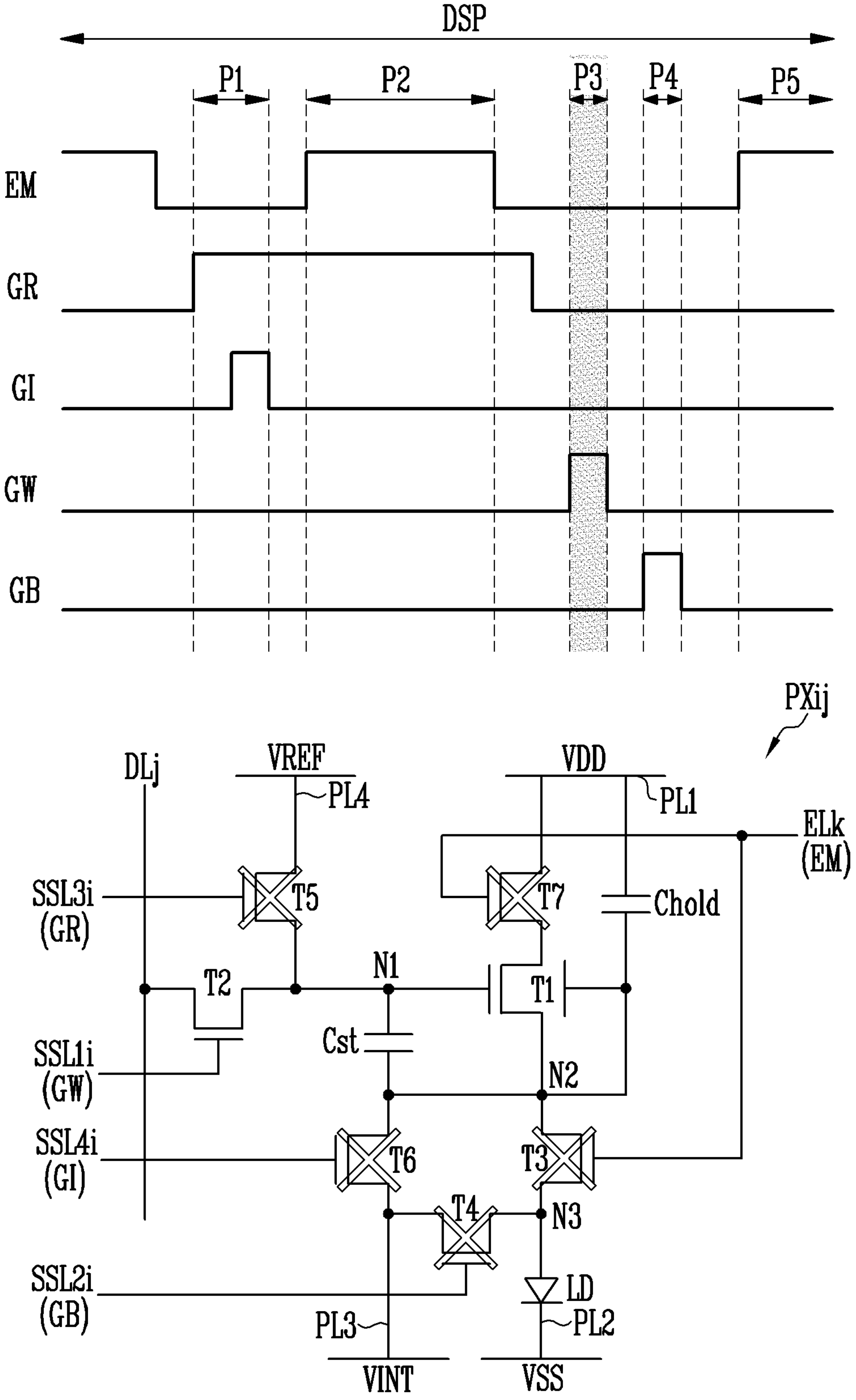

Referring to FIG. 5C, during the third period P3, the first scan signal GW may be supplied to the first scan line SSL1i and the emission control signal EM may be supplied to the emission control line Elk. In case that the emission control signal EM is supplied to the emission control line Elk, the third transistor T3 and the seventh transistor T7 may be turned off. In case that the first scan signal GW is supplied to the first scan line SSL1i, the second transistor T2 may be turned on, and thus the data signal from the data line DLj may be supplied to the first node N1. During the third period P3, the first node N1 may maintain the voltage of the data signal.

The voltages of the first node N1 and the second node N2 during the third period P3 may be expressed as Equation Group 3.

$$VN1 = Vdata$$
$$VN2 = VREF - Vth1$$
[Equation Group 3]

In Equation Group 3, Vdata may be the voltage of the data signal. In Equation Group 3, for convenience of description, it has been described that the second node N2 maintains the VREF−Vth1 voltage during the third period P3, but an embodiment of the disclosure may not be limited thereto.

For example, during the third period P3, the first node N1 may be changed from the reference voltage VREF to a voltage Vdata of the data signal, and the voltage of the second node N2 may also be changed due to coupling of the first capacitor Cst. However, the voltage of the second node N2 may be changed in correspondence with a ratio of the first capacitor Cst and the second capacitor Chold, and thus a voltage change amount of the second node N2 may be minimized. Hereafter, for convenience of description, it may be assumed that the second node N2 maintains the VREF−Vth1 voltage during the third period P3.

Figure 5D:
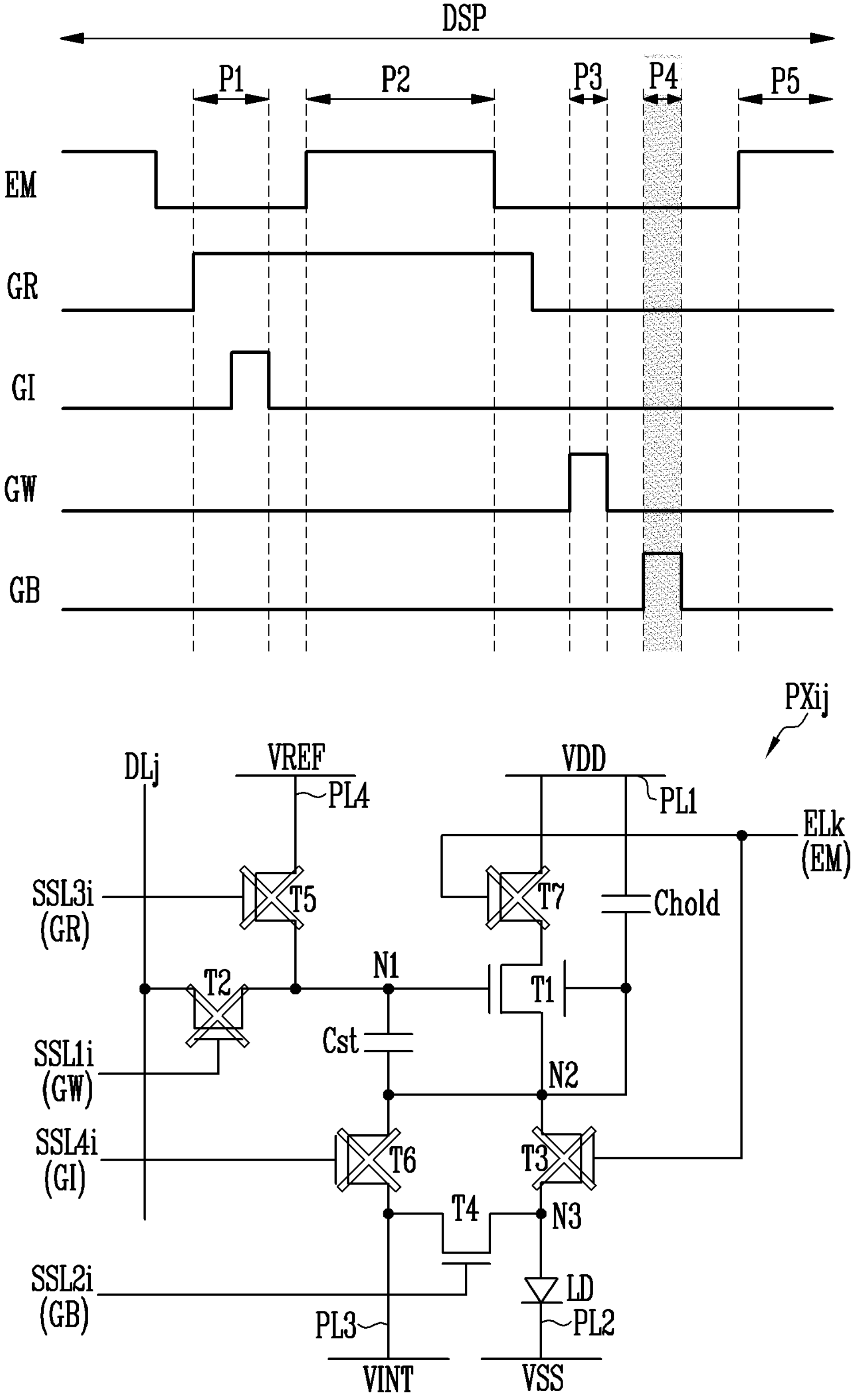
Figure 5E:
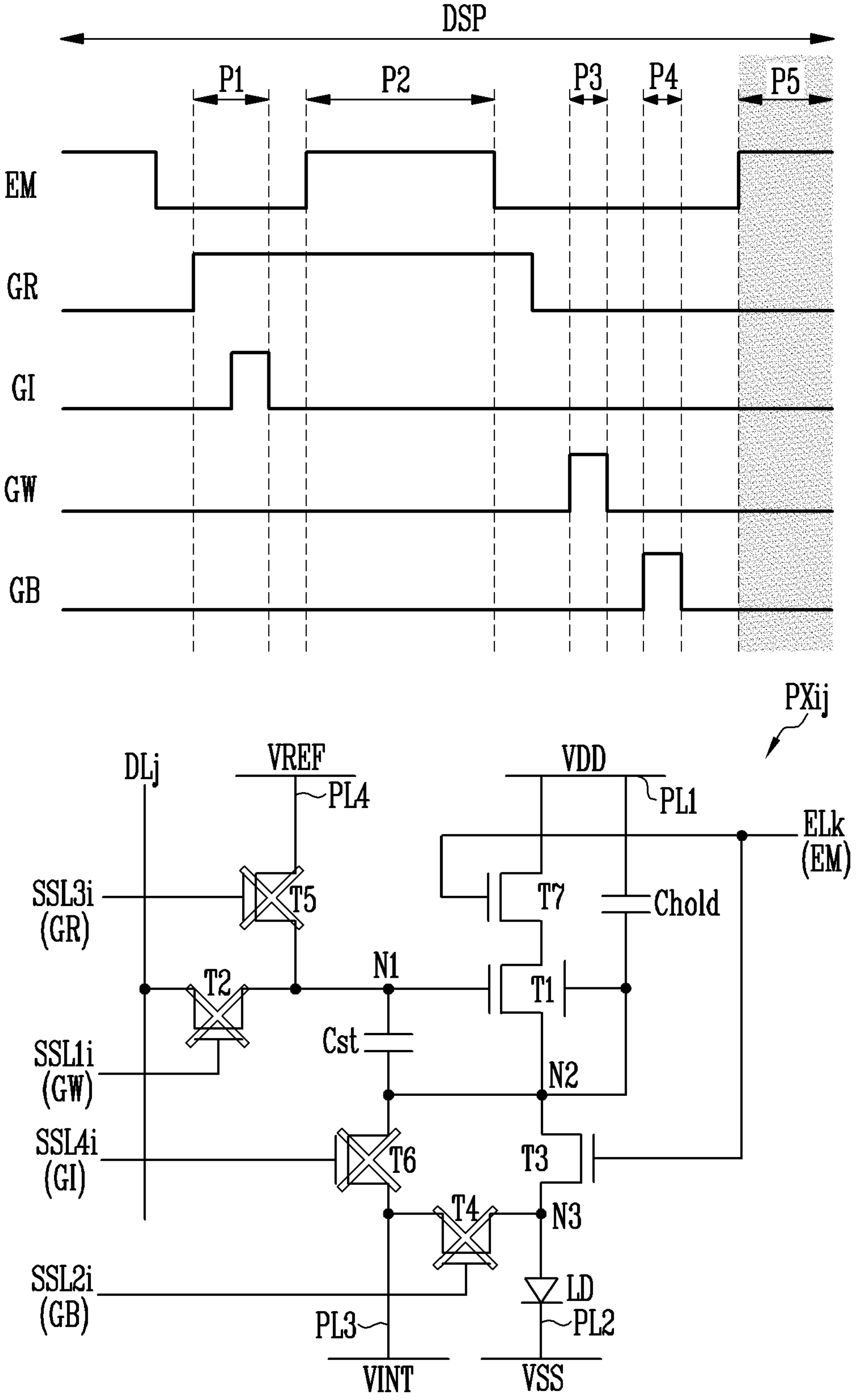

Referring to FIG. 5D, during the fourth period P4, the second scan signal GB may be supplied to the second scan line SSL2i and the emission control signal EM may continue to be supplied to the emission control line ELk. The emission control signal EM may be supplied during the third period P3 and the fourth period P4. In case that the emission control signal EM may be supplied to the emission control line ELk, the third transistor T3 and the seventh transistor T7 may be turned off. In case that the second scan signal GB may be supplied to the second scan line SSL2i, the fourth transistor T4 may be turned on, and thus the initialization voltage VINT may be supplied to the third node N3. For example, during the fourth period P4, the anode electrode of the light emitting element LD (or the parasitic capacitor of the light emitting element LD) may be initialized with the initialization voltage VINT.

Referring to FIG. 5E, during the fifth period P5, supply of the emission control signal EM to the emission control line ELk may be stopped. In case that supply of the emission control signal EM to the emission control line Elk is stopped, the third transistor T3 and the seventh transistor T7 may be turned on. In case that the third transistor T3 may be turned on, the second node N2 and the third node N3 may be electrically connected. In case that the seventh transistor T7 may be turned on, the first voltage line PL1 and the first transistor T1 may be electrically connected. During the fifth period P5, the first transistor T1 may supply the driving current Ild corresponding to the voltage of the first node N1 from the first voltage line PL1 to the second voltage line PL2 via the light emitting element LD. At this time, the light emitting element LD may generate light of the luminance corresponding to the driving current Ild. The driving current Ild supplied to the light emitting element LD during the fifth period P5 may be expressed as Equation Group 4.

[Equation Group 4]

$$VN1 = Vdata + (V1d - VREF + Vth1)$$

$$VN2 = V1d$$

$$I1d = k \times \left(\frac{Cst}{Cst + Chold + Cld}(Vgs - Vth1)\right)^2 = k \times \left(\frac{Cst}{Cst + Chold + Cld}(Vdata - VREF)\right)^2$$

In Equation Group 4, Ild may be the driving current supplied from the first transistor T1. Vld may be the voltage of the second node N2 corresponding to the driving current Ild, k may be a constant. Vgs may be the gate-source voltage of the first transistor T1, Cst may be a capacitance of the first capacitor, Chold may be a capacitance of the second capacitor, and Cld may be a capacitance of the parasitic capacitor formed in the light emitting element LD. As can be gleaned from Equation 4, the driving current Ild supplied to the light emitting element LD may be determined independent of the threshold voltage Vth1 of the first transistor T1, and thus a luminance non-uniformity phenomenon due to a threshold voltage deviation of the first transistor T1 may be prevented.

Figure 6A:
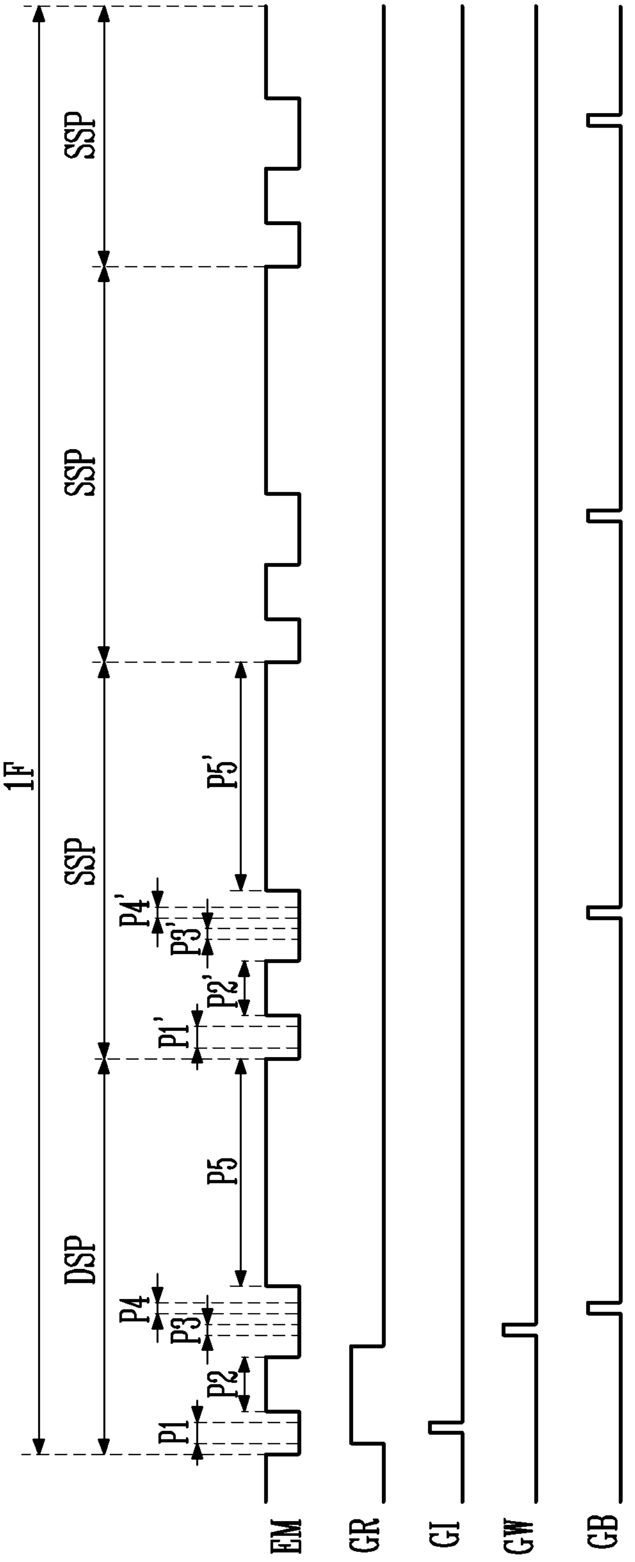
FIGS. 6A and 6B are schematic diagrams illustrating an embodiment of the driving signal supplied to the pixel during one frame period.
Figure 6B:
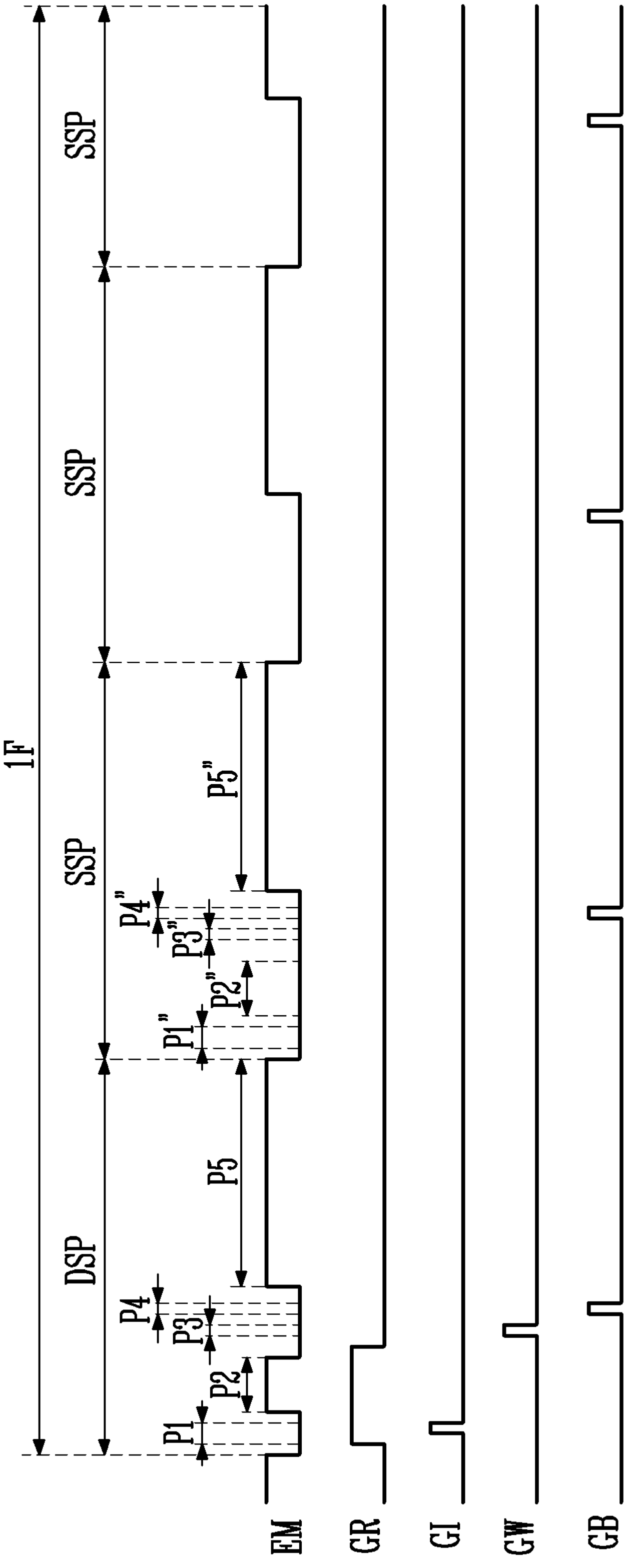

FIGS. 6A and 6B are schematic diagrams illustrating an embodiment of the driving signals supplied to the pixel during one frame period. Referring to FIG. 6A, one frame 1F period may include one display scan period DSP and at least one self-scan period SSP.

The display scan period DSP may be a period in which the voltage of the data signal may be stored in the pixels PX, and the above-described driving signals of FIG. 4 may be supplied. For example, the display scan period DSP may include the first period P1, the second period P2, the third period P3, the fourth period P4, and the fifth period P5 shown in FIG. 4, and the scan signals GW, GB, GR, and GI and the emission control signal EM may be supplied in each corresponding period (at least one period among P1 to P5).

The self-scan period SSP may be a period in which the pixels PX may be set to a non-emission state while maintaining the data signal supplied in the display scan period DSP. One or more such self-scan periods SSP may be included in one frame 1F period. In case that the self-scan period SSP may be included in one frame 1F, the pixels PX may be set to the non-emission state at a regular interval, and thus video quality may be improved. The self-scan period SSP may include first periods P1' and P1", second periods P2' and P2", third periods P3' and P3", fourth periods P4' and P4", and fifth periods P5' and P5" respectively corresponding to the first period P1, the second period P2, the third period P3, the fourth period P4, and the fifth period P5 of FIG. 4.

Referring to FIG. 6A, during the self-scan period SSP, the emission control signal EM and the second scan signal GB may be supplied to have the same period and waveform as the display scan period DSP. For example, the emission control signal EM may be supplied during the first period P1', the third period P3', and the fourth period P4', and the second scan signal GB may be supplied during the fourth period P4'.

In case that the emission control signal EM may be supplied, the third transistor T3 and the seventh transistor T7 included in each of the pixels PX may be turned off, and thus the pixels PX may be set to the non-emission state. In case that the second scan signal GB may be supplied, the fourth transistor T4 may be turned on, and thus the anode electrode of the light emitting element LD may be initialized with the initialization voltage VINT. In case that the anode electrode of the light emitting element LD may be initialized during the self-scan period SSP, the luminance of the light emitting element LD may be prevented from being increased after the self-scan period SSP. In case that the emission control signal EM may be supplied only in the first period P1', the third period P3', and the fourth period P4', the pixels PX may emit light during the second period P2'.

Referring to FIG. 6B, during the self-scan period SSP, the emission control signal EM may be supplied during the first period P1", the second period P2", the third period P3", and the fourth period P4" corresponding to the first period P1, the second period P2, the third period P3, and the fourth period P4 of the display scan period DSP. In case that the emission control signal EM may be supplied, the third transistor T3 and the seventh transistor T7 included in each of the pixels PX may be turned off, and thus the pixels PX may be set to the non-emission state during the first period P1", the second period P2", the third period P3", and the fourth period P4". The second scan signal GB may be supplied during the fourth period P4" of the self-scan period SSP. In case that the second scan signal GB may be supplied, the fourth transistor T4 may be turned on, and thus the anode electrode of the light emitting element LD may be initialized with the initialization voltage VINT.

Figure 7:
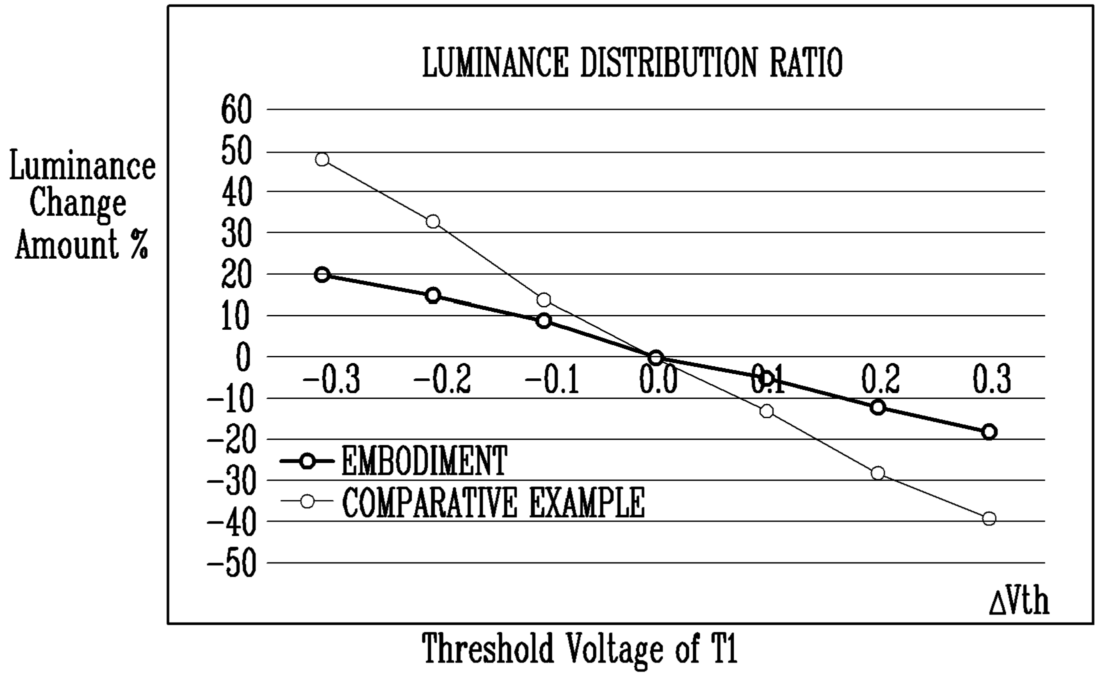
FIG. 7 is a schematic diagram illustrating a luminance distribution ratio of an embodiment of the disclosure and a comparative example.

FIG. 7 is a schematic diagram illustrating a luminance distribution ratio of an embodiment of the disclosure and a comparative example. In FIG. 7, an X-axis represents the threshold voltage of the driving transistor (for example, the first transistor T1 of FIG. 2), and a Y-axis represents a luminance change amount in percentage (%). The embodiment may refer to the pixel of FIG. 2, and the comparative example may refer to a pixel in which the third transistor T3 and the fourth transistor T4 may be removed from the pixel of FIG. 2. In case that the third transistor T3 and the fourth transistor T4 are removed from the pixel of FIG. 2 (for example, the pixel of the comparative example), the initialization voltage VINT supplied to the third node N3 during the self-scan period SSP may instead be supplied to the second node N2. In case that the initialization voltage VINT is supplied to the second node N2, the voltage of the first node N1 may also be changed by the coupling of the first capacitor Cst. The threshold voltage of the first transistor T1 compensated in the display scan period DSP may be changed, and thus a threshold voltage compensation capability may be reduced.

Referring to FIG. 7, in a case of an embodiment of the disclosure, in case that the threshold voltage of the first transistor T1 may be changed from −0.3V to 0.3V, the luminance may be changed by about 20% to about −20%. However, in a case of the comparative example, in case that the threshold voltage of the first transistor T1 may be changed from about −0.3V to about 0.3V, the luminance may be changed by about 50% to about −40%. For example, in the case of the embodiment of the disclosure, the threshold voltage of the first transistor T1 may be more accurately compensated for compared to the comparative example.

Figure 8:
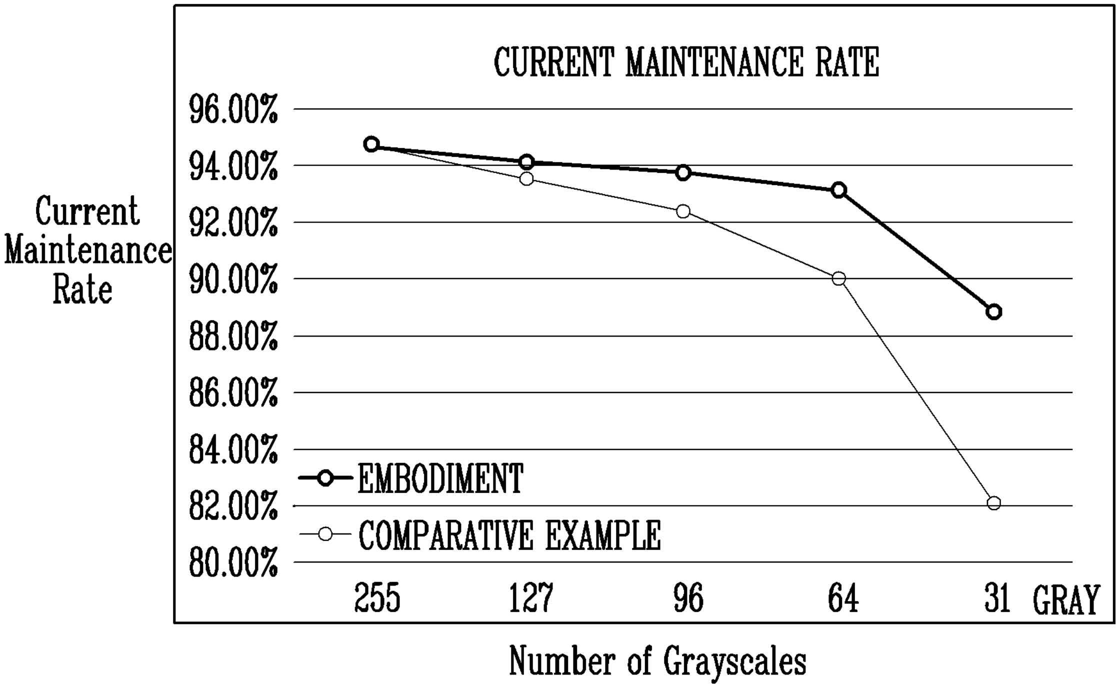
FIG. 8 is a schematic diagram illustrating a current maintenance rate of an embodiment of the disclosure and a comparative example.

FIG. 8 is a schematic diagram illustrating a current maintenance rate of an embodiment of the disclosure and a comparative example. The current maintenance rate represents the magnitude of current flowing through the pixel after setting the magnitude of current flowing through the pixel of the display device 10 to about 100% during initial driving and driving the display device 10 during a period (e.g., predetermined or selectable period) as a percentage (%). In case that the current maintenance rate may be high, an afterimage characteristic may be improved. FIG. 8 may show a current maintenance rate between the pixel of the embodiment of the disclosure and a pixel of the comparative example after driving the display device 10 for a duration of about 5000 hours.

Referring to FIG. 8, the pixel according to an embodiment of the disclosure has a current maintenance rate of approximately 93% or more at 64 grayscales or higher, and has a current maintenance rate of approximately 89% at 31 grayscales. The pixel according to the comparative example has a current maintenance rate of approximately 90% or more at 64 grayscales or higher, and has a current maintenance rate of approximately 82% at 31 grayscales. Consequently, the pixel according to the embodiment of the disclosure has the current maintenance rate higher than that of the comparative example, and thus an afterimage compensation capability may be improved.

Figure 9:
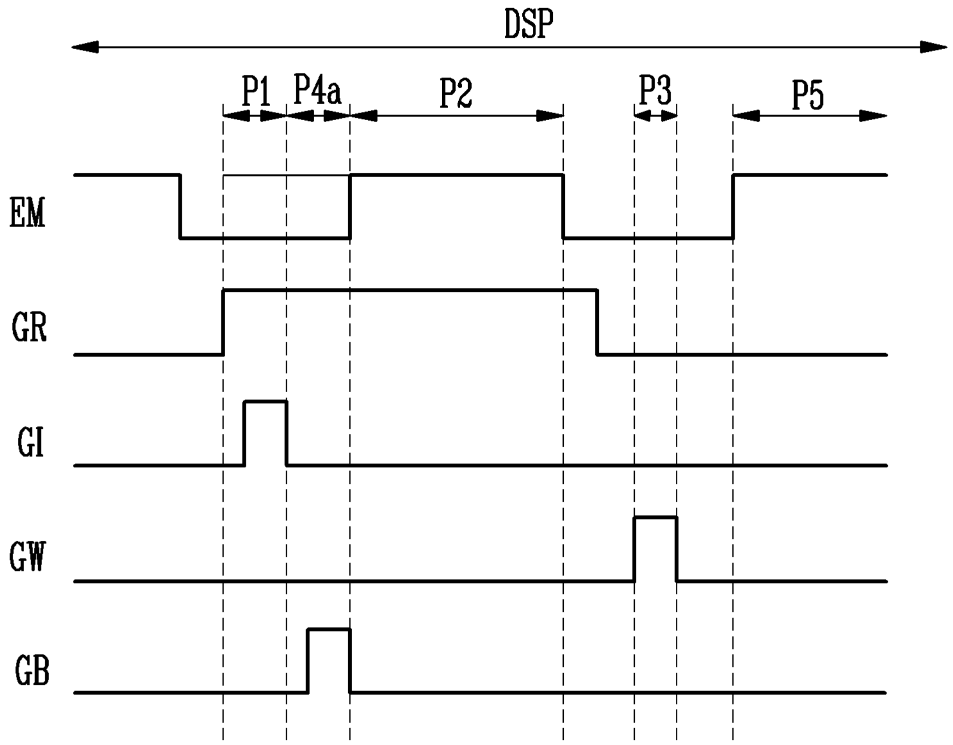
FIG. 9 is a schematic diagram illustrating an embodiment of the driving signals supplied to the pixel of FIG. 2.

FIG. 9 is a schematic diagram illustrating an embodiment of the driving signals supplied to the pixel circuit of FIG. 2. FIG. 9 may illustrate the driving signal supplied in the display scan period DSP. In this description of FIG. 9, a detailed description related to a portion overlapping that of FIG. 4 may be omitted.

Referring to FIG. 9, in an embodiment of the disclosure, a fourth period P4a may be positioned between the first period P1 and the second period P2. During the fourth period P4a, the second scan signal GB may be supplied to the second scan line SSL2i. In case that the second scan signal GB may be supplied to the second scan line SSL2i, the fourth transistor T4 may be turned on, and thus the first electrode of the light emitting element LD may be initialized with the initialization voltage VINT. For example, in the embodiment of FIG. 9, after the first capacitor Cst may be initialized during the first period P1, the first electrode of the light emitting element LD may be initialized during the fourth period P4a. After the fourth period P4a, the second period P2, the third period P3, and the fifth period P5 may occur.

Figure 10:
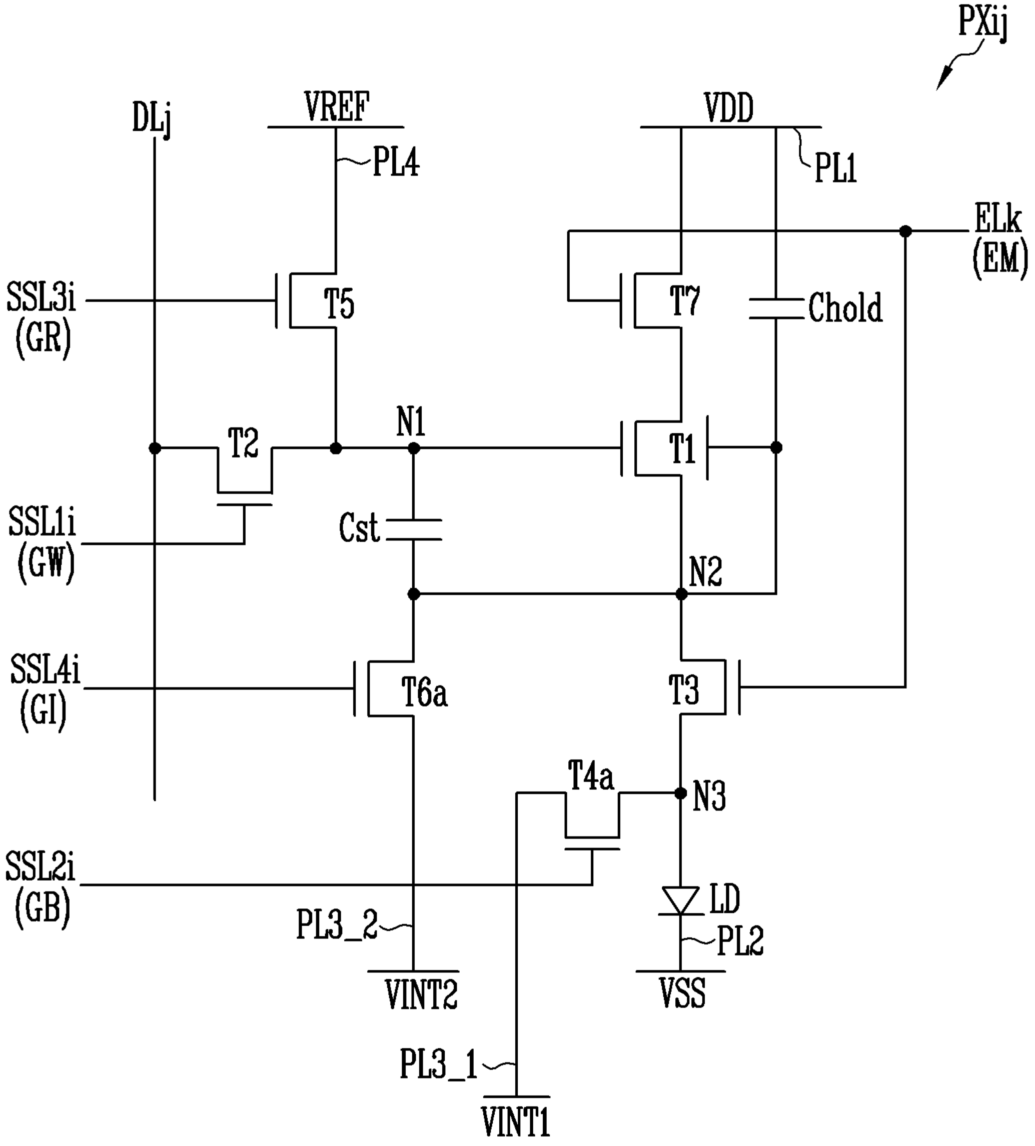
FIG. 10 is a schematic diagram illustrating an embodiment of the pixel shown in FIG. 1.

FIG. 10 is a schematic diagram illustrating an embodiment of the pixel shown in FIG. 1. In this description of FIG. 10, a description of a configuration overlapping that of FIG. 2 may be omitted. Referring to FIG. 10, the third voltage line PL3 may include a (3-1)-th voltage line P3_1 (or a third voltage line or third-first voltage line, which is a first voltage line associated with the third voltage line; hereinafter "3-1-th voltage line") and a (3-2)-th voltage line P3_2 (or a fifth voltage line or third-second voltage line, which is a second voltage line associated with the third voltage line; hereinafter "3-2-th voltage line"). The initialization voltage VINT may include first initialization voltage VINT1 (or initialization voltage) and second initialization voltage VINT2.

A sixth transistor T6*a* may be electrically connected between the (3-2)-th voltage line PL3_2 and the second node N2. In addition, a gate electrode of the sixth transistor T6*a* may be electrically connected to the fourth scan line SSL4i. The sixth transistor T6*a* may be turned on in case that the fourth scan signal GI may be supplied to the fourth scan line SSL4i to supply a voltage of the second initialization voltage VINT2 to the second node N2.

A fourth transistor T4*a* may be electrically connected between the (3-1)-th voltage line PL3_1 and the third node N3. In addition, a gate electrode of the fourth transistor T4*a* may be electrically connected to the second scan line SSL2i. The fourth transistor T4*a* may be turned on in case that the second scan signal GB may be supplied to the second scan line SSL2i to supply a voltage of the first initialization voltage VINT1 (or the initialization voltage) to the third node N3.

For example, the pixel of FIG. 10 may be the same as the pixel of FIG. 2 except that the pixel of FIG. 10 initializes the second node N2 using the second initialization voltage VINT2 and initializes the third node N3 using the first initialization voltage VINT1. The second initialization voltage VINT2 supplied to the second node N2 may be set so that the second node N2 may be initialized. The first initialization voltage VINT1 supplied to the third node N3 may be set to initialize the anode electrode of the light emitting element LD. The first initialization voltage VINT1 and the second initialization voltage VINT2 may be set to different voltages.

Although the above has been described with reference to the embodiments of the disclosure, those skilled in the art will understand that the disclosure may be variously corrected and modified within the scope without departing from the spirit and scope of the disclosure described in the claims.

What is claimed is:

1. A pixel comprising:

a light emitting element;

a first transistor that controls a magnitude of a current flowing from a first voltage line to a second voltage line via the light emitting element in response to a voltage at a first node electrically connected to a first gate electrode of the first transistor;

a second transistor electrically connected between a data line and the first node and having a gate electrode electrically connected to a first scan line;

a third transistor electrically connected between the first transistor and a first electrode of the light emitting element and having a gate electrode electrically connected to an emission control line;

a fourth transistor electrically connected between the first electrode of the light emitting element and a third voltage line to which a first initialization voltage is supplied and having a gate electrode electrically connected to a second scan line;

a first capacitor electrically connected between the first node and a second node, the second node being a common node having a first end electrically connected between the first transistor and the third transistor and a second end electrically connected between the first capacitor and the third voltage line;

a second capacitor electrically connected between the first voltage line and the second node; and a sixth transistor electrically connected between the first voltage line and the first transistor, the sixth transistor having a gate electrode electrically connected to the emission control line.

2. The pixel according to claim 1, further comprising:

a fifth transistor electrically connected between a fourth voltage line to which a reference voltage is supplied and the first node and having a gate electrode electrically connected to a third scan line.

3. The pixel according to claim 2, further comprising:

a seventh transistor electrically connected between the second node and the third voltage line, and having a gate electrode electrically connected to a fourth scan line.

4. A pixel comprising:

a light emitting element;

a first transistor that controls a magnitude of a current flowing from a first voltage line to a second voltage line via the light emitting element in response to a voltage at a first node electrically connected to a first gate electrode of the first transistor;

a second transistor electrically connected between a data line and the first node and having a gate electrode electrically connected to a first scan line;

a third transistor electrically connected between the first transistor and a first electrode of the light emitting element and having a gate electrode electrically connected to an emission control line;

a fourth transistor electrically connected between the first electrode of the light emitting element and a third voltage line to which a first initialization voltage is supplied and having a gate electrode electrically connected to a second scan line;

a first capacitor electrically connected between the first node and a second node, the second node being a common node between the first transistor and the third transistor;

a second capacitor electrically connected between the first voltage line and the second node; and a seventh transistor electrically connected between the second node and a fifth voltage line to which a second initialization voltage is supplied, and having a gate electrode electrically connected to a fourth scan line, the second initialization voltage being different from both the first initialization voltage and a voltage of the second voltage line.

5. The pixel according to claim 3, wherein turn-on periods of the fifth transistor and the seventh transistor overlap at least in a partial period.

6. The pixel according to claim 5, wherein the turn-on period of the seventh transistor does not overlap a turn-on period of the third transistor and a sixth transistor, and the turn-on period of the fifth transistor at least partially overlaps the turn-on period of the third transistor and the sixth transistor.

7. The pixel according to claim 3, wherein a turn-on period of the second transistor does not overlap a turn-on period of the third transistor, the fourth transistor, the fifth transistor, and the seventh transistor, and the second transistor is turned on after the fifth transistor and the seventh transistor are turned on.

8. The pixel according to claim 1, wherein the first transistor further comprises a second gate electrode electrically connected to the second node.

9. A display device comprising:

a pixel being driven during a frame that includes a display scan period in which the pixel receives a data signal and a self-scan period in which the data signal is maintained;

a scan driver that drives a plurality of first scan lines, a plurality of second scan lines, a plurality of third scan lines, and a plurality of fourth scan lines;

an emission driver that drives a plurality of emission control lines;

a data driver that drives a plurality of data lines; and a power supply that supplies a first voltage, a second voltage, a reference voltage, and a first initialization voltage, wherein the pixel is disposed on an i-th horizontal line and a j-th vertical line, “i” and “j” each being a natural number, the pixel comprises:

a light emitting element;

a first transistor that controls a magnitude of a current flowing from a first voltage line to which the first voltage is supplied to a second voltage line to which the second voltage is supplied via the light emitting element in response to a voltage at a first node electrically connected to a first gate electrode of the first transistor;

a second transistor that is electrically connected between one of the plurality of data lines and the first node and is turned on in case that a first scan signal is supplied to one of the plurality of first scan lines electrically connected to a gate electrode of the second transistor;

a third transistor that is electrically connected between the first transistor and a first electrode of the light emitting element and is turned off in case that an emission control signal is supplied to one of the plurality of emission control lines electrically connected to a gate electrode of the third transistor;

a fourth transistor that is electrically connected between the first electrode of the light emitting element and a third voltage line to which the first initialization voltage is supplied, and is turned on in case that a second scan signal is supplied to one of the plurality of second scan lines electrically connected to a gate electrode of the fourth transistor;

a first capacitor electrically connected between the first node and a second node, the second node being a common node between the first transistor and the third transistor;

a second capacitor electrically connected between the first voltage line and the second node; and a sixth transistor electrically connected between the first voltage line and the first transistor and is turned off in case that the emission control signal is supplied to the one of the plurality of emission control lines.

10. The display device according to claim 9, wherein the pixel further comprises:

a fifth transistor electrically connected between a fourth voltage line to which the reference voltage is supplied and the first node and is turned on in case that a third scan signal is supplied to one of the plurality of third scan lines electrically connected to a gate electrode of the fifth transistor.

11. The display device according to claim 10, wherein the pixel further comprises:

a seventh transistor electrically connected between the second node and the third voltage line and is turned on in case that a fourth scan signal is supplied to one of the plurality of fourth scan lines electrically connected to a gate electrode of the seventh transistor.

12. The display device according to claim 10, wherein the pixel further comprises:

a seventh transistor that is electrically connected between the second node and a fifth voltage line to which a second initialization voltage is supplied and is turned on in case that a fourth scan signal is supplied to one of the plurality of fourth scan lines electrically connected to a gate electrode of the seventh transistor.

13. The display device according to claim 11, wherein the display scan period comprises a first period, a second period, a third period, and a fourth period that are temporally successive.

14. The display device according to claim 13, wherein the emission driver supplies the emission control signal to the one of the plurality of emission control lines during the first period and the third period, and the scan driver supplies:

the fourth scan signal to the one of the plurality of fourth scan lines during the first period, the third scan signal to the one of the plurality of third scan lines during both the first period and the second period, and the first scan signal to the one of the plurality of first scan lines during the third period.

15. The display device according to claim 14, wherein the scan driver supplies the second scan signal to the one of the plurality of second scan lines during a fifth period between the third period and the fourth period, and the emission driver supplies the emission control signal to the one of the plurality of emission control lines during the fifth period.

16. The display device according to claim 14, wherein the scan driver supplies the second scan signal to the one of the plurality of second scan lines during a fifth period between the first period and the second period, and the emission driver supplies the emission control signal to the one of the plurality of emission control lines during the fifth period.

17. The display device according to claim 9, wherein the first transistor further comprises a second gate electrode electrically connected to the second node.

18. The display device according to claim 9, wherein the self-scan period comprises a first period, a second period, a third period, and a fourth period that are temporally successive.

19. The display device according to claim 18, wherein the scan driver supplies the second scan signal to the one of the plurality of second scan lines during a fifth period between the third period and the fourth period, and the emission driver supplies the emission control signal to the one of the plurality of emission control lines during the first period, the second period, the third period, and the fifth period.

20. The display device according to claim 18, wherein the scan driver supplies the second scan signal to the one of the plurality of second scan lines during a fifth period between the first period and the second period, and the emission driver supplies the emission control signal to the one of the plurality of emission control lines during the first period, the fifth period, the second period, and the third period.

* * * * *